United States Patent
Vänttinen et al.

(10) Patent No.: US 7,167,457 B2
(45) Date of Patent: *Jan. 23, 2007

(54) METHOD FOR CONNECTION ESTABLISHMENT IN A RADIO SYSTEM RELAYING PACKET-SWITCHED TRAFFIC

(75) Inventors: Veijo Vänttinen, Espoo (FI); Jussi Rajala, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/950,679

(22) Filed: Sep. 28, 2004

(65) Prior Publication Data

US 2005/0105479 A1 May 19, 2005

Related U.S. Application Data

(63) Continuation of application No. 10/021,297, filed on Dec. 19, 2001, now Pat. No. 6,813,280, which is a continuation of application No. PCT/FI00/00551, filed on Jun. 20, 2000.

(30) Foreign Application Priority Data

Jun. 21, 1999 (FI) ........................ 991412
Nov. 25, 1999 (FI) ................... 19992520

(51) Int. Cl.
 H04Q 7/00 (2006.01)
 H04L 12/66 (2006.01)
(52) U.S. Cl. .................................. 370/328; 370/349
(58) Field of Classification Search ................ 370/236, 370/278, 280, 294, 295, 328, 329, 343, 345, 370/347, 349, 389, 477, 478, 480, 498, 277
See application file for complete search history.

(56) References Cited

U.S. PATENT DOCUMENTS 5,504,939 A 4/1996 Mayrand et al.

(Continued)

FOREIGN PATENT DOCUMENTS

GB 2 285 900 7/1995

(Continued)

OTHER PUBLICATIONS

"GSM 03.60 version 6.3.2. Release," Chapters 5,6 and 9.2-9.6, (1997).

Primary Examiner—Chau Nguyen
Assistant Examiner—Ahmed Elallam
(74) Attorney, Agent, or Firm—Pillsbury Winthrop Shaw Pittman LLP

(57) ABSTRACT

The invention relates to a method for connection establishment and a radio system relaying packet traffic. A terminal informs the system that it wishes to transmit data. The network part receives the message and allocates default radio resources and informs the allocated resources to the terminal. The terminal sends a first control message to inform the terminal's radio path characteristics. According to the solution of the invention, when allocating the default amount of radio resources to the terminal, the network part is arranged to reserve one or more radio blocks for the terminal's control messages. When the terminal sends the network part information about its radio path characteristics, it is arranged to inform in the message if there are additional characteristics. In that case, the terminal sends a second control message including information about its radio path characteristics.

20 Claims, 7 Drawing Sheets

U.S. PATENT DOCUMENTS

| | | |
|---|---|---|
| 5,729,534 A | 3/1998 | Jokinen et al. |
| 5,742,592 A | 4/1998 | Scholefield et al. |
| 5,870,394 A | 2/1999 | Oprea |
| 6,031,832 A | 2/2000 | Turina |
| 6,167,248 A | 12/2000 | Hamalainen et al. |
| 6,317,418 B1 | 11/2001 | Raitola et al. |
| 6,438,142 B1 | 8/2002 | Bousquet |
| 6,473,438 B1 | 10/2002 | Cioffi et al. |
| 6,532,227 B1 | 3/2003 | Leppisaari et al. |
| 6,693,892 B1* | 2/2004 | Rinne et al. ................ 370/348 |
| 6,782,264 B2* | 8/2004 | Anderson ................ 455/456.1 |
| 2002/0071480 A1* | 6/2002 | Marjelund et al. .......... 375/141 |

FOREIGN PATENT DOCUMENTS

| | | |
|---|---|---|
| WO | WO 98/49476 | 11/1998 |
| WO | WO 99/09724 | 2/1999 |

\* cited by examiner

METHOD FOR CONNECTION ESTABLISHMENT IN A RADIO SYSTEM RELAYING PACKET-SWITCHED TRAFFIC

This application is a continuation of U.S. patent application Ser. No. 10/021,297, filed Dec. 19, 2001 now U.S. Pat. No. 6,813,280, which is a continuation of International Application PCT/FI00/00551, filed Jun. 20, 2000, which relies for priority on Finnish Application Nos. 991412, filed Jun. 21, 1999 and 19992529, filed Nov. 25, 1999, the contents of all of which are incorporated herein by reference in their entireties.

FIELD OF THE INVENTION

The invention relates to a radio system relaying packet-switched traffic and to a method for connection establishment in a radio system relaying packet-switched traffic. The invention relates particularly to a radio system where terminals have various radio path characteristics.

BACKGROUND OF THE INVENTION

A significant shortcoming in current radio systems and in those that are being developed is the limited amount of radio resources available. The number of radio frequencies is restricted and they are distributed among various systems and operators. Numerous different solutions have been created to solve this problem.

Previously developed radio systems meant for public use are based on circuit-switched technology. In systems implemented according to this technology, a specific channel is reserved for the connection between the devices involved, the connection being available to the devices for the entire duration of the connection, irrespective of whether there is traffic on the channel all the time or not. This solution has been sufficient for systems relaying primarily speech. However, with increasing telecommunications needs, transmission connections are used for transmitting data. The traffic relayed on data connections is often highly bursty, i.e., at times data is transferred in large amounts and a lot of transmission capacity is needed on the channel, whereas occasionally the traffic load on the channel is low. From the point of view of capacity deployment, packet-switched transmissions are an extremely good solution for these connections. In packet-switched connections, the channel is not allocated to the terminals for the entire duration of the connection, but the channel is only allocated when data needs to be transferred. Consequently, diverse radio systems employing packet-switched service have been developed, at least some of the connections between the terminals being established using a packet protocol. Among these systems are GPRS (General Packet Radio System) and its enhanced version EGPRS (Enhanced General Packet Radio System).

Since various data services are available and they have differing data transmission needs, many systems include the possibility to establish connections of varying capacity. Moreover, many systems involve diverse terminals which may be provided with highly varying data transmission properties and capability to deploy the resources of the system. For example, different equipment and data transfer capacity is needed for transferring speech, written communications or video. In addition, there may be devices that can only use specific frequency ranges and others that can utilize all the frequencies reserved for the network. Consequently, when a radio connection is to be established, the system should know the type of the terminal that needs the connection and the data transmission capacity. There are also networks that may have different packet system protocols available, such as the GPRS and EGPRS, and, depending on its characteristics, the terminal can use one or the other.

In prior art solutions a terminal that needs to transmit data in packet format contacts the network and informs that it wishes to establish a connection and, at the same time, it informs what kind of a terminal it is, i.e., the radio path characteristics it has. These characteristics include for example the frequencies the device needs for communication, and the transfer modes of different capacities that the terminal can utilize. A prior art signalling for connection establishment is illustrated in FIG. 1. The Figure shows the essential parts of messages sent by different devices. The messages sent by the network part are marked with DL (downlink). A terminal sends a CR (Channel Request) 100 to the network part of the system. The network part allocates one radio block to the terminal and responds by sending the terminal an IA (Immediate Assignment) 102. The terminal uses the allocated radio block to send a PRR (Packet Resource Request) 104. This request comprises information about the terminal's radio path characteristics. The network part allocates one or more channels to the terminal and responds by sending a new response 106 where the reserved channels are informed to the terminal. The terminal then starts to send data 108. In the example of FIG. 1, the terminal uses three parallel 110–114 channels.

One of the drawbacks of the above method is that it is not possible to know whether the terminal needs GPRS (General Packet Radio System) or EGPRS (Enhanced General Packet Radio System) resources. Another problem is that one allocated block is sufficient for sending one control message, but one control message is not always enough for relaying the radio characteristics of the terminal. Consequently, a terminal having diversified characteristics does not necessarily receive appropriate resources.

The signalling that takes place before data transmission is a multi-step process, i.e., it comprises a plural number of steps depending on the amount of data to be transferred and the amount resources available. When GPRS is used, the signalling can take place either on a PCCCH (Packet Common Control Channel) or a CCCH (Common Control Channel), but with EGPRS only PCCCH can provide efficient signalling. This causes delay in the transmission of the signal and yet the data transmission is not necessarily carried out in an optimal way due to insufficient signalling capacity.

BRIEF DESCRIPTION OF THE INVENTION

It is therefore an object of the invention to provide a method and a radio system allowing connections between a terminal and a network to be established smoothly and effectively. This is achieved with a connection establishment method of the invention employed in a radio system relaying packet service, in which method the terminal informs the system network part that it wishes to send data to the network part; the network part receives the message and allocates a default amount of radio resources to the terminal; the network part informs the allocated resources to the terminal; the terminal sends a first control message to inform the network part about the terminal's radio path characteristics. According to the method of the invention, when the network part allocates the default amount of radio resources to the terminal, it reserves one or more radio blocks for the terminal's control messages, and when the terminal sends information about its radio path characteristics to the network part, the terminal also informs in the message if there are additional characteristics, and, in that case, the terminal sends a second control message comprising information about the terminal's radio path characteristics.

The invention also relates to a radio system relaying packet-switched traffic, in which system a terminal is arranged to inform the system network part that it wishes to send data to the network part; a network part is arranged to receive the message and to allocate a default amount of radio resources to the terminal; the network part is arranged to inform the allocated resources to the terminal; the terminal is arranged to send a first control message to inform the terminal's radio path characteristics to the network part. According to the system of the invention, when the network part allocates the default number of radio resources to the terminal, the network part is arranged to reserve one or more radio blocks for the terminal's control messages, and when the terminal informs the network part about its radio path characteristics, the terminal is arranged to inform in the message if there are additional characteristics, and, in that case, the terminal is then arranged to send a second control message comprising information about the terminal's radio path characteristics.

According to a preferred embodiment of the invention, after having received the information about the allocated resources from the network part, the terminal starts to send data to the network part, immediately after it has sent the requested control messages using the allocated radio resources.

In another preferred embodiment of the invention, the terminal is allocated a predetermined number of channels immediately after the first channel request. Data transmission can then begin, and, when it begins, the terminal's characteristics are signalled to the network. According to another preferred embodiment of the invention, the network part is arranged to allocate radio resources to the terminal in accordance with the terminal's characteristics, which allows the number of channels to be increased, when necessary.

According to a further preferred embodiment of the invention, the first control message comprises information about the terminal's radio path characteristics preferably with regard to the frequency band the network part first inquired about in the control message it sent. The second control message sent by the terminal informs the terminal's radio path characteristics preferably with regard to all frequency bands available in the network. If there are so many radio path characteristics that they cannot be included even in this message, then new control messages are sent until all the radio path characteristics have been informed within the scope of the allocated resources.

The method and arrangement of the invention provide several advantages. Data transmission can be rapidly initiated and channel deployment becomes more efficient. On the other hand, the network is informed more effectively than before about the terminal's characteristics, which allows an appropriate number of channels to be allocated for a connection. Furthermore, the terminal can be used for sending more information to the network than before, i.e., information from all frequency bands supported by the network and the terminal. Previously the information has been limited to one frequency band alone.

BRIEF DESCRIPTION OF THE DRAWINGS

In the following the invention will be described in greater detail in connection with preferred embodiments and with reference to the accompanying drawings, in which.

DESCRIPTION OF PREFERRED EMBODIMENTS

Figure 2:
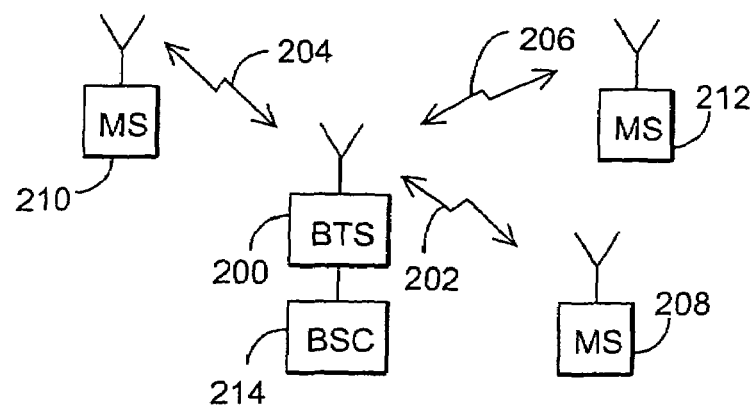
FIG. 2 illustrates an example of a telecommunications system in which the invention can be applied.

The present invention can be used in various radio systems relaying packet service in which terminals are provided with diverse radio path characteristics. The multiple access method employed in the system is not significant as such. For example, multiple access methods such as CDMA, WCDMA and TDMA can be used. Also, the system can support both circuit- and packet-switched connections. FIG. 2 illustrates a digital data transmission system in which the solution of the invention can be applied. It is a part of a cellular radio system comprising a base station 200 which has a bi-directional connection 202–206 to subscriber terminals 208–212. The base station is further connected to a base station controller 214 which relays the terminals' connections further to other parts of the network. In the simplified example shown in FIG. 2 some of the connections can be circuit-switched and others packet-switched connections.

Figure 3:
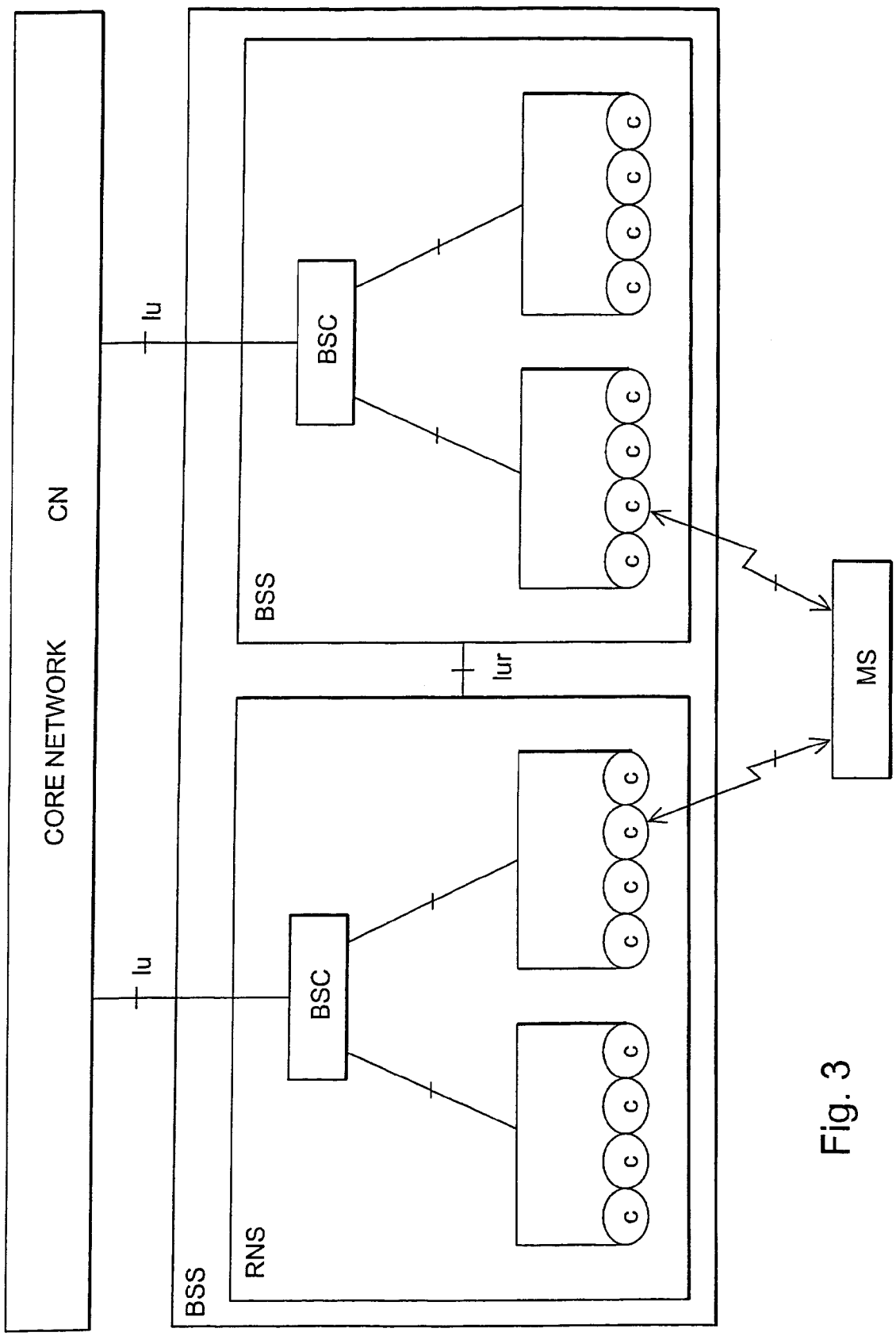
FIG. 3 illustrates the structure of another mobile communications system used as an example.

With reference to FIG. 3, the structure of a mobile communications system used as an example will be described. The main parts of the mobile communications system are core network CN, above-ground radio access network BSS and subscriber station MS. In this example the interface between the CN and the BSS is called Gb, and the air interface between the BSS and the MS is called Um.

The radio access network consists of base station subsystems BSS. Each BSS comprises a base station controller BSC and one or more base transceiver stations BTS. The interface between the base station controller BSC and the base station BTS has not been standardized. The coverage area of the base station, i.e., a cell, is indicated with 3 C in the Figure.

Figure 4:
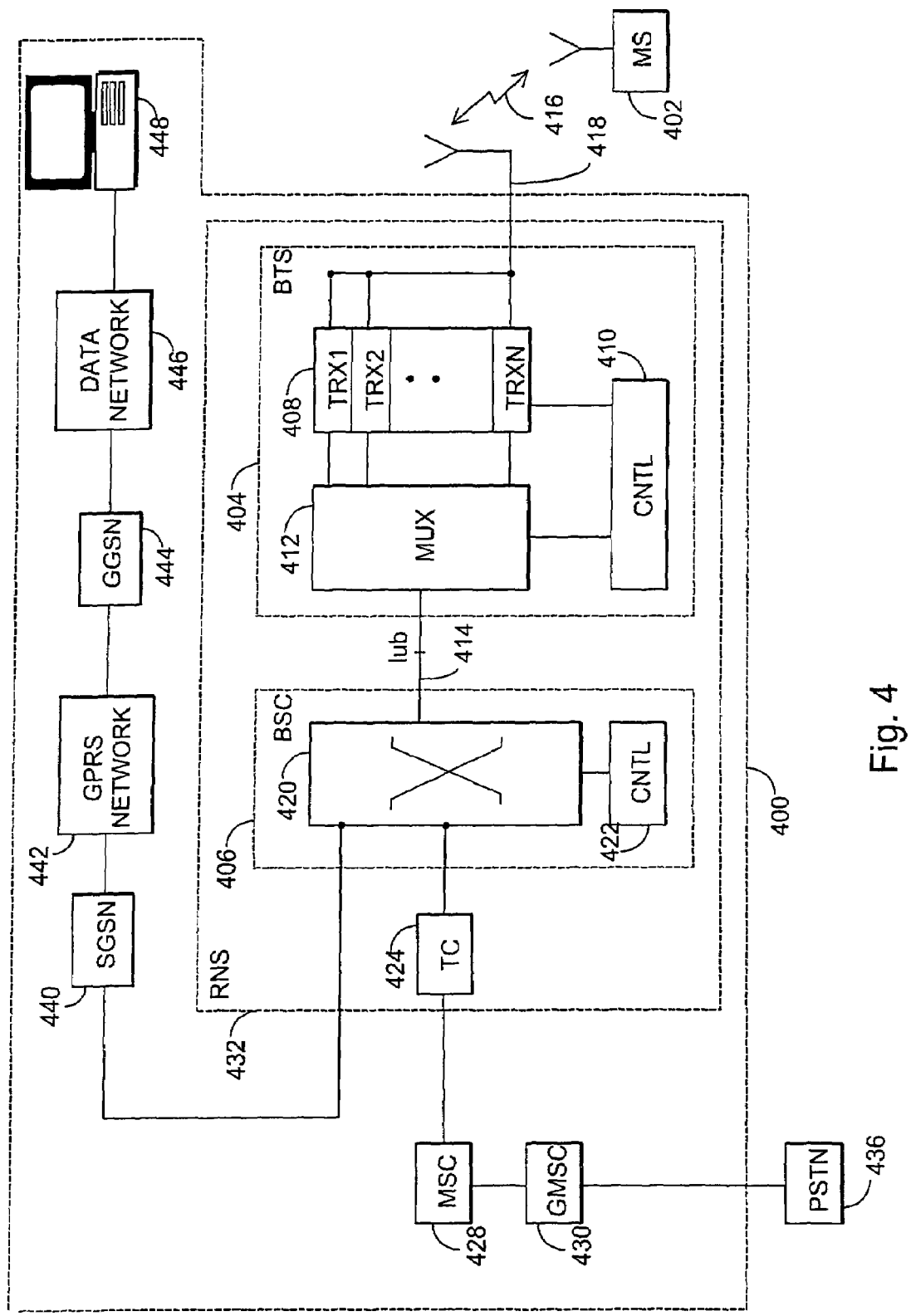
FIG. 4 illustrates in greater detail the structure of a mobile communications system used as an example.

The description given in FIG. 3 is rather abstract and therefore it is clarified with a more detailed example of a cellular radio system given in FIG. 4. FIG. 4 only comprises the most essential blocks, but a person skilled in the art will find it apparent that a conventional cellular radio network also comprises other functions and structures which need not be explained in greater detail in this context. It is also pointed out that FIG. 4 only shows one exemplary structure. The details of systems according to the invention may vary from those shown in FIG. 4, but such differences are not significant to the invention.

A cellular radio network typically comprises a fixed network infrastructure, i.e., a network part 400, and subscriber terminals 402, which may be fixedly located, vehicle-mounted or portable terminals. The network part 400 comprises base stations 404. A plural number of base stations 404 are, in turn, controlled in a centralized manner by a base station controller 406 communicating with them. The base station 404 comprises transceivers 408 and a multiplexer 412.

The base station 404 further comprises a control unit 410 which controls the operation of the transceivers 408 and the multiplexer 412. The multiplexer 412 arranges the traffic and control channels used by several transceivers 408 to a single transmission connection 414, which forms an interface hub.

The transceivers 408 of the base station 404 are connected to an antenna unit 418 which is used for implementing a bi-directional radio connection 416 to the subscriber terminal 402. The structure of the frames to be transmitted in the bi-directional radio connection 416 is defined separately in each system, the connection being referred to as an air interface Um.

The base station controller 406 comprises a group switching field 420 and a control unit 422. The group switching field 420 is used for connecting speech and data and for combining signalling circuits. The base station 404 and the radio network controller 406 form a radio network subsystem 432 which further comprises a transcoder 424. The transcoder 424 is usually located as close to a mobile services switching centre 428 as possible, because speech can then be transferred in a cellular radio network form between the transcoder 424 and the base station controller 406, which saves transmission capacity.

The transcoder 424 converts different digital speech coding forms used between a public switched telephone network and a radio network to make them compatible, for instance from a fixed network form to another cellular radio network form, and vice versa. The control unit 422 performs call control, mobility management, collection of statistical data and signalling.

FIG. 4 further shows the mobile services switching centre 428 and a gateway mobile services switching centre 430 which controls the connections between the mobile communications system and the outside world, in this case to a public switched telephone network 436.

As is seen in FIG. 4, the group switching field 420 can be used for switching to both the public switched telephone network PSTN 436, through the mobile services switching centre 428, and to a packet transmission network 442.

The connection between the packet transmission network 442 and the group switching field 420 is established by a SGSN (Serving GPRS Support Node) 440. The function of the support node 440 is to transfer packets between the base station subsystem and a GGSN (Gateway GPRS Support Node) 444, and to keep record of the subscriber terminal's 402 location within its area.

The gateway node 444 connects a public packet transmission network 446 with the packet transmission network 442. An Internet protocol or an X.25 protocol can be used at the interface. The gateway node 444 encapsulates the inner structure of the packet transmission network 442 to conceal it from the public packet transmission network 446, therefore the public packet transmission network 446 sees the packet transmission network 442 as a subnetwork, and the public packet transmission network can address packets to and receive them from the subscriber terminal 402 located in the network.

The packet transmission network 442 is typically a private network employing an Internet protocol and carrying signalling and tunneled user data. Below the Internet protocol layer, both the architecture and protocols of the network structure 442 may vary according to operator.

The public packet transmission network 446 may be for example the global Internet network, to which a terminal 448, such as a server computer, communicating with the network wishes to transfer packets addressed to the subscriber terminal 402.

At the air interface 416 packet transmission typically takes place in time slots not allocated for circuit-switched transmission. Packet transmission capacity is allocated dynamically, i.e., when a data transmission request is received, any free channel may be allocated for packet transmission. The arrangement is flexible, circuit-switched connections having priority over packet transmission connections. When necessary, a circuit-switched connection cancels a packet-switched connection, i.e., a time slot engaged in packet transmission is allocated to a circuit-switched connection. This is possible because packet transmission tolerates such interruptions well: the transmission simply continues in another time slot allocated to the connection. Another possibility to implement the arrangement is that circuit-switched transmissions are not given any absolute priority, but both circuit-switched and packet-switched transmission requests are served in their order of arrival. Such arrangements are not, however, significant to the present invention.

Figure 5:
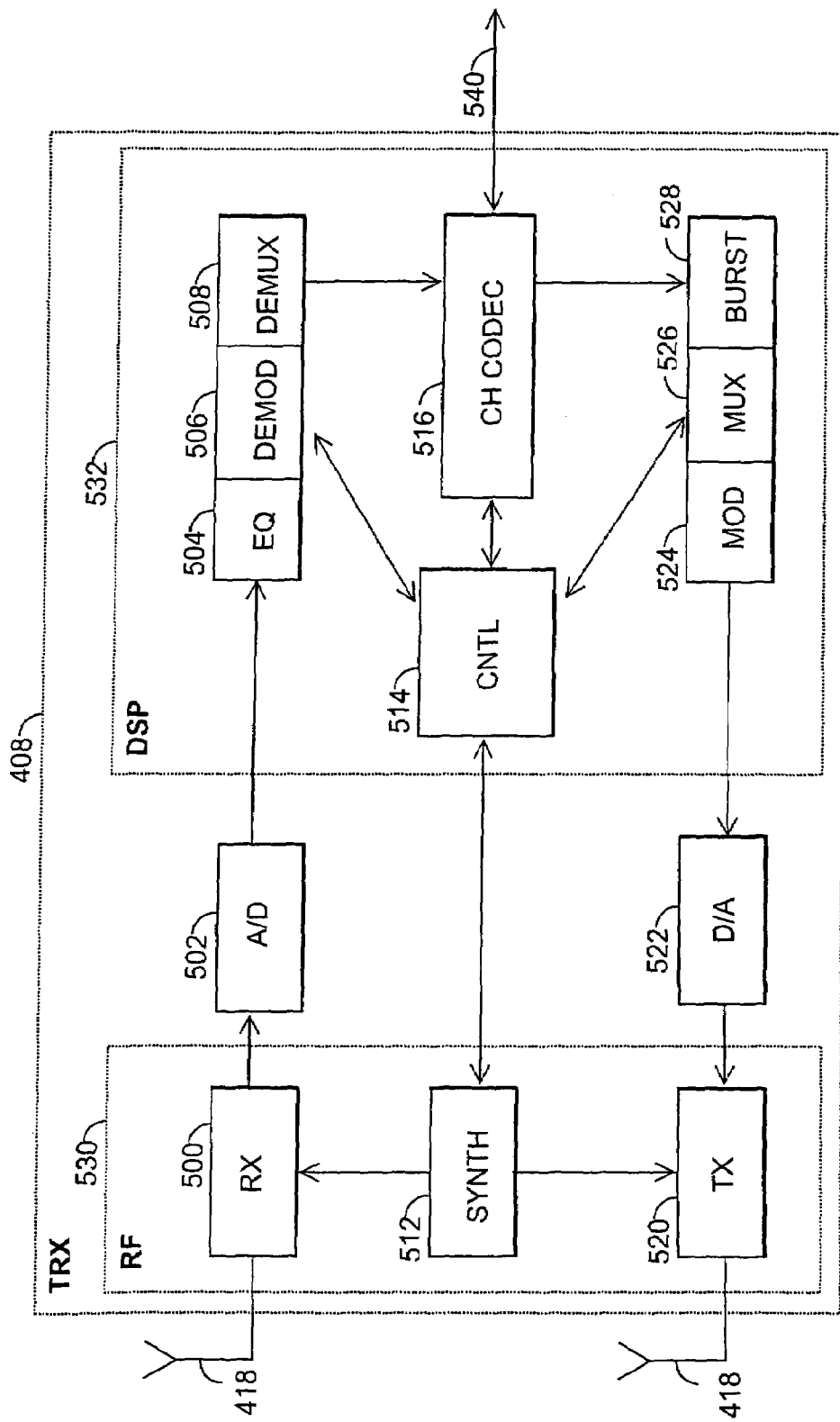
FIG. 5 illustrates an example of the structure of a transceiver according to a system of the invention.

FIG. 5 describes the structure of a transceiver 408 in greater detail. A receiver 500 comprises a filter blocking frequencies outside the desired frequency band. A signal is then converted to an intermediate frequency, or directly to baseband, in which form the signal is sampled and quantized in an analog-to-digital converter 502. An equalizer 504 compensates for disturbance, caused for example by multi-path propagation. A demodulator 506 extracts a bit stream from the equalized signal for transmission to a demultiplexer 508. The demultiplexer 508 separates the bit stream from the different time slots into the specific logical channels. A channel codec 516 decodes the bit stream of the different logical channels, i.e., it decides whether the bit stream is signalling data, which is to be transmitted to a control unit 514, or speech, which is to be transmitted 540 to a transcodec 424 of the base station controller 406. The channel codec 516 also performs error correction. The control unit 514 carries out internal control functions by controlling the separate units. A burst former 528 adds a training sequence and a tail to the data arriving from the channel codec 516. The multiplexer 526 assigns a time slot for each burst. The modulator 524 modulates the digital signals onto a radio frequency carrier. This is an analog function and therefore a digital-to-analog converter 522 is needed for performing it. A transmitter 520 comprises a filter for restricting the bandwidth. In addition, the transmitter 520 controls the output power of the transmission. A synthesizer 512 arranges the necessary frequencies for the different units. The synthesizer 512 comprises a clock which may be controlled either locally or centrally, from somewhere else, for example from the base station controller 506. The synthesizer 512 generates the necessary frequencies for example by using a voltage-controlled oscillator.

As shown in FIG. 5, the transceiver structure can be further divided into radio frequency parts 530 and digital signal processing including software 532. The radio frequency parts 530 comprise the receiver 500, transmitter 520 and synthesizer 512. The digital signal processor with the software 532 comprises the equalizer 504, demodulator 506, demultiplexer 508, channel codec 516, control unit 514, burst former 528, multiplexer 526 and modulator 524. To convert an analog radio signal to a digital signal, the analog-to-digital converter 502 is needed and, correspondingly, to convert a digital signal to an analog one, the digital-to-analog converter 522 is needed.

The structure of the subscriber terminal 402 can also be described using the description of the transceiver 408 in FIG. 5. The structural parts of the subscriber terminal 402 are operationally the same as those of the transceiver 408. In addition to the above described structure, the subscriber terminal may comprise a duplex filter between an antenna 418 and the receiver 500 and the transmitter 520, user interface parts and a speech codec. The speech codec is connected to the channel codec 516 over a bus 540. The functions of the invention can be provided in the terminal typically by software incorporating all the necessary commands and placed at the disposal of the terminal's control unit.

In the network part the functions of the invention can be advantageously implemented by software. The software comprising the necessary function commands can be placed at the base station, the radio network controller or in the support node SGSN in a unit that processes RLC-MAC protocol messages. The RLC-MAC messages relate to the protocols used in radio networks, the protocols being typically formed in accordance with the OSI (Open Systems Interconnection) model of the ISO (International Standardization Organization). In the RLC/MAC sublayer (Radio Link Control/Medium Access Control), the RLC part is responsible for segmenting and collecting the data to be transmitted. In addition, the RLC part conceals quality fluctuations in the radio connection of the physical layer from the upper layers. The MAC part allocates traffic channels to and releases them from radio bearers.

Figure 6A:
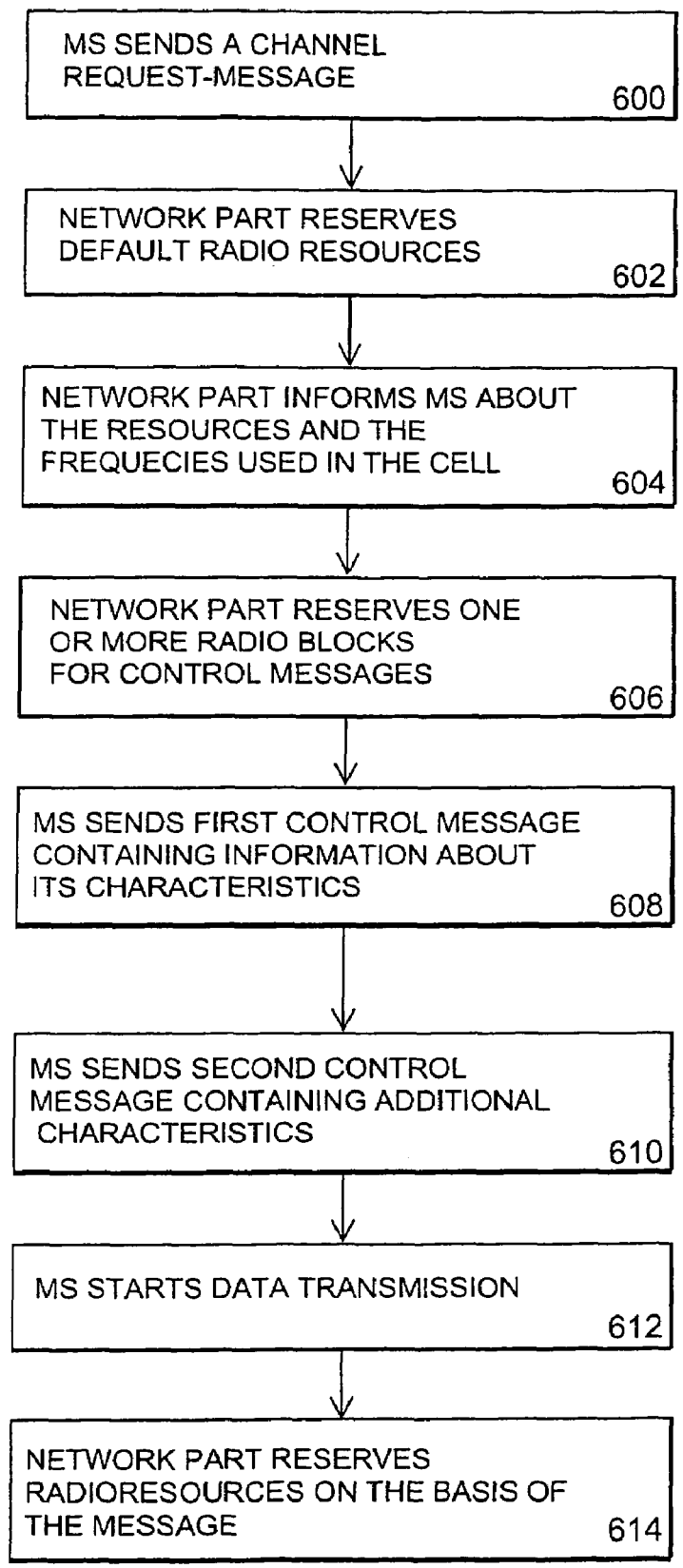
FIGS. 6a and 6b illustrate a method of the invention.

Let us now examine the operation of the inventive solution with reference to the flow diagram of FIG. 6a in a situation where the terminal needs to send information in packet format. A system known as the EGPRS (Enhanced General Packet Radio System) will be used as an example in this specific case, the invention not being, however, restricted to it. In the example, a TBF (Temporary Block Flow) connection is established between two devices for data transmission.

In the first step, the terminal sends a Channel Request CR 600 to the network part. The terminal uses a specific training sequence to indicate to the base station that the channel request in question is specifically of the EGPRS-type. If the request were of a GPRS-type, another kind of training sequence would be used. After having received the message, the network part allocates to the terminal a channel on the radio path for data transmission (step 602) and informs the terminal about the allocated resources by sending an AGCH-PUA (Access Grant Channel Packet Uplink Assignment) message 604. The message may also comprise information about the frequencies used in the cell and about the frequency band with regard to which the base station first wishes to know the terminal's characteristics. Moreover, the network part allocates in step 606 one or more radio blocks to the terminal for control messages.

The terminal then sends the network part a PRR (Packet Resource Request) message in a first control block (step 608). The message comprises information about the terminal's radio path characteristics, preferably relating to the frequency band that was requested in the first AGCHPUA message. The PRR message further comprises information stating that the terminal has also other characteristics than those mentioned in the message.

In the next control block in step 610 the terminal sends a second message ARAC (Additional Radio Access Capability) in which the terminal's radio path characteristics are stated preferably with regard to all other frequency bands available in the network. The terminal receives this information in step 604. If the terminal has more characteristics than a single ARAC message can accommodate, several ARAC messages are sent within the resources allocated. The sending of the actual data does not start until the control messages have been sent. In the next phase 612 the terminal starts to send data to the network part, using the radio resources allocated to it.

If necessary, in step 614 the network part re-allocates new resources to the terminal on the basis of the information it has received.

If the terminal does not support other frequency bands than those already mentioned in the first control message, then a second control message is not needed, but data can be sent instead. The network part is able to distinguish data from control messages on the basis of the message headers.

The PRR and the ARAC should both be sent within N blocks from the starting of the data transmission, N being preferably 40. If the transmission is shorter than N blocks, then neither of the control messages is sent.

In a preferred embodiment of the invention, the network part uses step 604, i.e., a message PUA (Packet Uplink Assignment) to ask for information about the frequency ranges and radio path characteristics that the terminal supports. In another preferred embodiment of the invention the network part uses a common signalling channel (also known as a broadcast channel) to inform all terminals located within its are that it wishes the terminals to broadcast information about the frequency ranges and radio path characteristics they support. The control channel can be for example a Broadcast (BCCH) or Packet Broadcast (PB-CCH) channel.

Figure 6B:
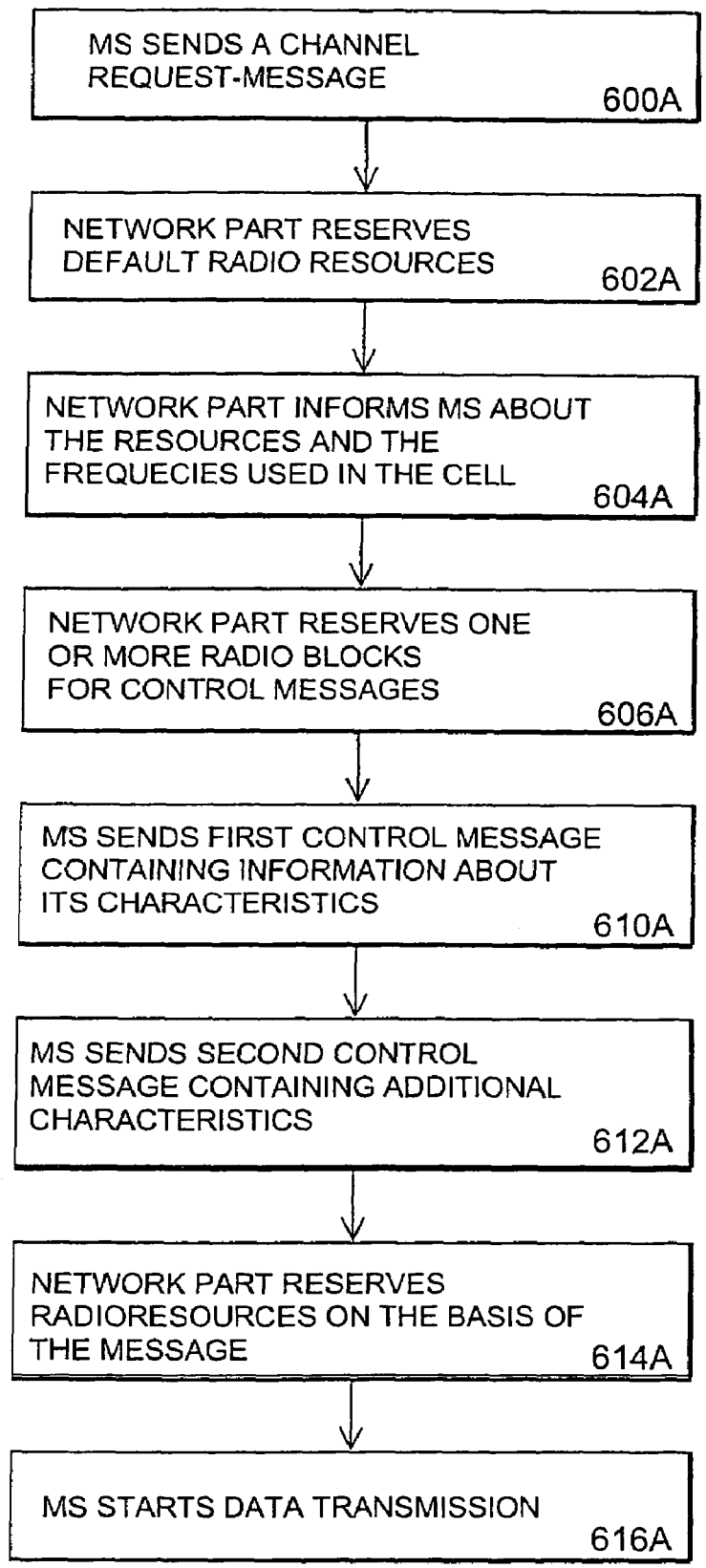

Let us then examine the operation of the inventive solution with reference to a flow diagram shown in FIG. 6b in a situation where a two-phase allocation method is used.

In the first phase, the terminal sends the network part a Channel Request CR 600A. The terminal uses a specific training sequence to indicate to the base station that the resource request is specifically of the EGPRS-type. After having received the message, the network part allocates to the terminal a specific number of channels on the radio path for data transmission (step 602A) and informs the terminal about the allocated resources by sending an AGCHPUA (Access Grant Channel Packet Uplink Assignment) message 604. The message may also comprise information about the frequencies used in the cell and about the frequency band with regard to which the base station first wishes to known the terminal's characteristics. In addition, the network part allocates in phase 606A one or more radio blocks to the terminal for control messages.

In the first control block the terminal sends a PRR (Packet Resource Request) message to the network part (step 610A). The message comprises information about the terminal's radio path characteristics, preferably relating to the frequency band that was first requested in the AGCHPUA message. The PRR message also comprises information stating that the terminal has other characteristics than those given in the message.

In the next control block in step 612A the terminal sends a second message ARAC (Additional Radio Access Capability) comprising information about the terminal's radio path characteristics, particularly with regard to all the frequency bands that are available in the network. The terminal received this information in step 604A. As in the previous alternative, also in this case the transmission of the message is optional.

If necessary the network allocates new resources in step 614A to the terminal on the basis of the information it has received.

In the next step 616A the terminal starts to send data to the network part using the radio resources allocated to it.

Figure 7A:
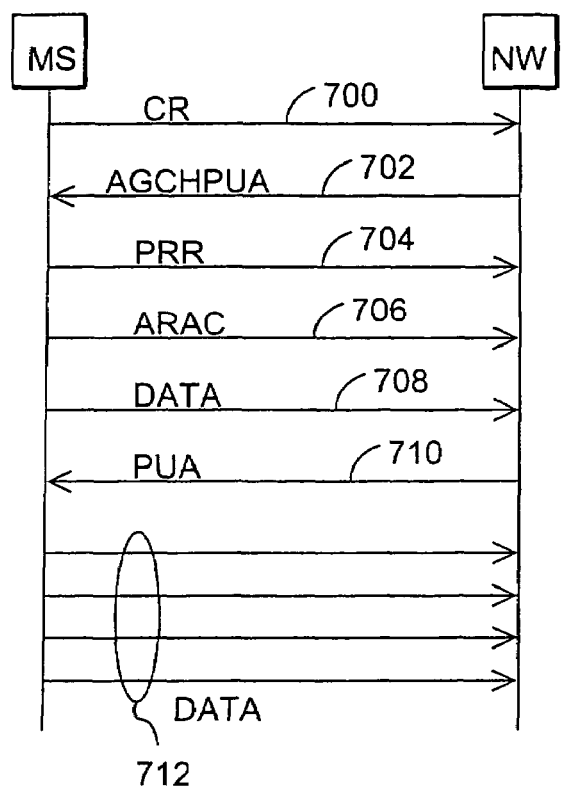
FIGS. 7a and 7b illustrate examples of a solution of the invention.

FIG. 7a illustrates an example of signalling according to a preferred embodiment of the invention. At first the terminal sends the network part a channel request CR (Packet Channel Request) 700. After having received the message, the network allocates to the terminal a channel on the radio path for data transmission and sends information about the allocated resources to the terminal in an AGCHPUA (Access Grant Channel Packet Uplink Assignment) 702. The terminal then sends a first control message PRR (Packet Resource Request) 704 which comprises information about the terminal's characteristics regarding the frequency band defined in the AGCHPUA message of the base station. Next, the terminal sends a second control message ARAC (Additional Radio Access Capability) 706 which comprises information about the terminal's characteristics relating to other frequency bands. This message is optional. After the control messages, the terminal starts to send data to the base station on one channel 708. If necessary, the network part allocates new resources to the terminal on the basis of the information it has received, and informs the terminal accordingly in step 710 with a PUA (Packet Uplink Assignment) message. After having received this message the terminal can transmit to the base station on several channels within the limits of its characteristics and the resources allocated to it.

Figure 7B:
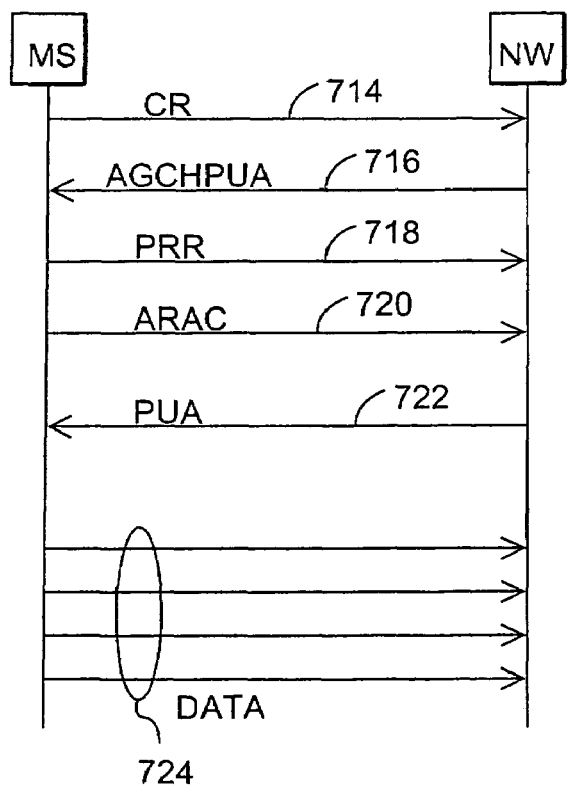

FIG. 7b illustrates another example of signalling according to a preferred embodiment of the invention. First the terminal sends the network part a Channel Request CR 714. After having received the message the network part allocates to the terminal a specific number of radio blocks on the radio path for transmission of control data, and informs the terminal about the allocated resources in an AGCHPUA (Access Grant Channel Packet Uplink Assignment) 716. The terminal then sends a PRR (Packet Resource Request) message 718 to the network part. Next, the terminal sends a second message ARAC (Additional Radio Access Capability) 720, which is an optional message. The network part receives the message, allocates additional resources, if necessary, and sends an acknowledgement (PUA message) 722. The terminal then starts data transmission 724 to the network part using the radio resources allocated to it.

Figure 1:
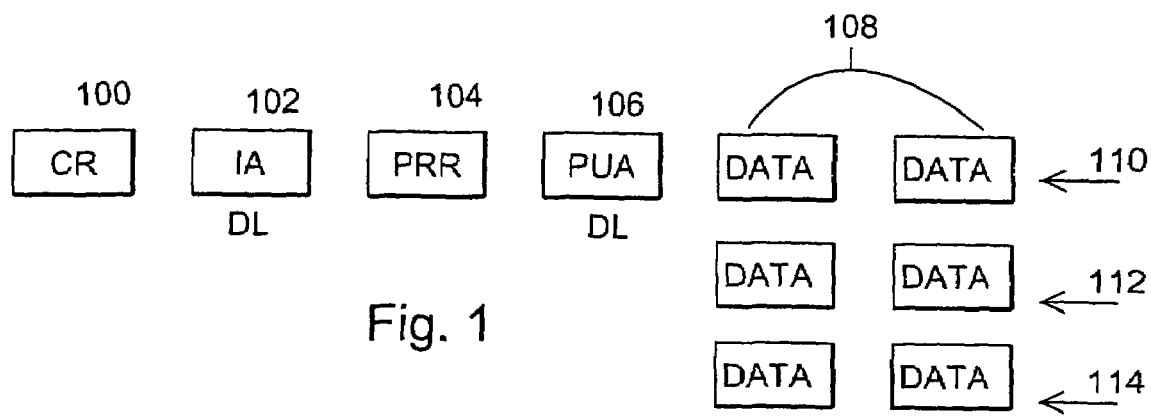
FIG. 1 illustrates the prior art solution described above.

An advantage of the two-phase allocation method of the invention compared with the prior art two-phase allocation method, which is illustrated in FIG. 1, is that the method of the invention allows more information about the terminal to be sent, i.e., information about all frequency bands supported by the network and the terminal. Previously the information was restricted to one frequency band alone.

Let us then examine an example of the structure of the ARAC message containing information about the terminal's radio path characteristics in the preferred EGPRS system:

```
< Additional Radio Access Capability > ::=
    < MESSAGE_TYPE : bit (6) >
    < Global TFI > :Global TFI IE) >
    < L | H < MS Radio Access Capability : MS Radio Access Capability
    IE>}
    < spare bits > ;
```

Global TFI is an information element (Temporary Flow Identifier) acting as a message identifier, i.e., it identifies the terminal a message is addressed to. MS Radio Access Capability is an information element comprising the necessary information about the terminal's radio path characteristics.

Let us then examine an example of the structure of the AGPHUA (Access Grant Channel Packet Uplink Assignment) message sent by the network.

```
< AGCH Packet Uplink Assignment > ::=
    < L2 PSEUDO LENGTH : bit (8) >
    < PROTOCOL DISCRIMINATOR : bit (4) >
    < SKIP INDICATOR : bit (4) >
    < MESSAGE TYPE : bit (8) >
    < Packet Request Reference : < Packet Request Reference IE > >
    { 0 < AGCH PUA Contents : < AGCH PUA contents struct >>
    -- Message not segmented
        | 10 < AGCH PUA part 1 contents : bit(134) > -- Segmented, 1st part
        | 11 < AGCH PUA part 2 contents : bit(*) > -- Segmented, 2nd part
    }
    < AGCH PUA contents struct > ::=
        { 00    -- Message escape
            < PAGE_MODE : bit (2) >
            < Frequency Parameters : < Frequency Parameters IE >>
            < TIME_SLOT NUMBER : bit (3) >
            < TA_VALUE : bit (6) >
            { 0 | 1 < ALPHA : bit (4) }
            < GAMMA : bit (5)
            < Access Technologies Request : Access Technologies Request struct >
            { 0 < Multi Block Allocation : < Multi Block Allocation struct > >
            | 1 < One PDCH Allocation : < One PDCH Allocation struct >>
            }
            < padding bits >
        ! < Message escape : { 01| 10 | 11 } bit (*) = <no string> > }};    - Extended for future
    changes
```

Access Technologies Request is a list used by the network for requesting the terminal to send information about itself. The elements on the list are preferably frequency ranges, such as 900, 1800, 1900 MHz, etc. The terminal sends information about its radio path characteristics relating to all the frequencies it supports.

Although the invention is described above with reference to an example shown in the attached drawings, it is apparent that the invention is not restricted to it, but may vary in many ways within the inventive idea disclosed in the attached claims.

The invention claimed is:

1. A terminal of a radio system relaying packet-switched traffic, the system comprising a network part, the terminal being configured to:
   inform the network part that the terminal intends to send data to the network part;
   receive from the network part information about radio resources allocated to the terminal and a query regarding the terminal's radio path characteristics on a specific frequency band supported by the terminal;
   send a first control message to inform the network part of the terminal's radio path characteristics, the message comprising information on whether there are additional radio path characteristics; and
   send a second control message comprising information about the terminal's additional radio path characteristics.

2. The terminal of claim 1, wherein the terminal starts to transmit data to the network part using the allocated radio resources after the terminal has received, from the network part, the information about the allocated radio resources.

3. The terminal of claim 1, wherein the network part simultaneously inquires about the terminal's characteristics when the network part informs the terminal of the default amount of allocated radio resources.

4. The terminal of claim 1, wherein the information about the terminal's radio path characteristics comprises information about the frequency ranges supported by the terminal.

5. The terminal of claim 1, wherein the information about the terminal's radio path characteristics comprises information about the terminal's capability to communicate using a plurality of time slots.

6. The terminal of claim 1, where in the network part inquires about the terminal's characteristics on a specific frequency band when informing the default amount of allocated resources to the terminal.

7. The terminal of claim 6, where in the first control message comprises information about the terminal's radio path characteristics relating to the frequency band the network part first inquired about in the control message the network part sent.

8. The terminal of claim 7, wherein the second control message comprises information about the terminal's radio path characteristics relating to all other frequency bands used in the network other than the specific frequency band.

9. The terminal of claim 1, wherein if all the terminal's radio path characteristics have been relayed in the first control message, then data is sent in place of the second control message.

10. The terminal of claim 1, wherein when the terminal informs the network part that the terminal intends to transmit data to the network part, the terminal uses a training sequence to inform the network part of the type of resources needed.

11. A network part of a radio system relaying packet-switched traffic the network part being configured to:
   receive from a terminal information indicating that the terminal intends to send data to the network part;
   allocate a default amount of radio resources to the terminal;
   reserve one or more radio blocks for the terminal's control messages;
   inform the terminal about radio resources allocated to the terminal and query the terminal about the terminal's radio path characteristics on a specific frequency band supported by the terminal when informing the terminal about the default amount of allocated resources;
   receive a first control message from the terminal, the message comprising information about the terminal's radio path characteristics and information on whether there are additional radio path characteristics; and
   receive a second control message from the terminal, the message comprising information about the terminal's additional radio path characteristics.

12. The network part of claim 11, wherein the network part is arranged to allocate radio resources to the terminal in accordance with the terminal's characteristics.

13. The network part of claim 11, wherein the terminal is arranged to start data transmission to the network part using the allocated radio resources after receiving the information about the allocated resources from the network part.

14. The network part of claim 11, wherein the network part is arranged to inquire about the terminal's characteristics when informing the terminal about the default amount of allocated resources.

15. The network part of claim 11, wherein the information about the terminal's radio path characteristics comprises information about the frequency ranges supported by the terminal.

16. The network part of claim 11, wherein the information about the terminal's radio path characteristics comprises information about the terminal's ability to communicate using a plurality of time slots.

17. The network part of claim 11, where in the first control message comprises information about the terminal's radio path characteristics relating to the frequency band the network part first inquired about in the control message the network part sent.

18. The network part of claim 17, wherein the second control message comprises information about the terminal's radio path characteristics relating to all other frequency bands used in the network part other than the specific frequency band.

19. The network part of claim 11, wherein if all the terminal's radio path characteristics have been relayed in the first control message, then data is sent in place of the second control message.

20. The network part of claim 11, wherein when the terminal informs the network part that the terminal intends to transmit data to the network part, the terminal uses a training sequence to inform the network part of the type of resources needed.

* * * * *